US008713368B2

(12) United States Patent
Lock

(10) Patent No.: US 8,713,368 B2
(45) Date of Patent: Apr. 29, 2014

(54) METHODS FOR TESTING ODATA SERVICES

(75) Inventor: Hendrik C. R. Lock, Linkenheim-Hochstetten (DE)

(73) Assignee: SAP AG, Walldorf (DE)

( * ) Notice: Subject to any disclaimer, the term of this patent is extended or adjusted under 35 U.S.C. 154(b) by 121 days.

(21) Appl. No.: 13/591,921

(22) Filed: Aug. 22, 2012

(65) Prior Publication Data

US 2014/0059381 A1   Feb. 27, 2014

(51) Int. Cl.
*G06F 11/00* (2006.01)

(52) U.S. Cl.
USPC .................................. 714/25; 714/48; 714/57

(58) Field of Classification Search
USPC ............................ 714/25, 30, 48, 57; 709/224
See application file for complete search history.

(56) References Cited

U.S. PATENT DOCUMENTS

| 2011/0320427 | A1* | 12/2011 | Ko et al. ................... | 707/709 |
| 2012/0101975 | A1* | 4/2012 | Khosravy ................... | 706/55 |
| 2012/0246334 | A1* | 9/2012 | Yang et al. ................. | 709/232 |

OTHER PUBLICATIONS

OData Validator, *Open Data Protocol: Service Validation Tool*, retrieved on Aug. 21, 2012 from <http://services.odata.org/validation/about.htm>, 1 page.

* cited by examiner

*Primary Examiner* — Sarai Butler
(74) *Attorney, Agent, or Firm* — Fish & Richardson P.C.

(57) ABSTRACT

The present disclosure describes computer implemented methods, computer systems, and computer readable mediums for recursively testing an OData service. One method may include extracting resource identifiers from an initial service document, and for each of the resource identifiers, retrieving a respective response document from the OData service. The method may further include applying a test function to each of the resource identifiers and respective response documents and recording a result of the test function for each of the resource identifiers. The method may further include recursively extracting new resource identifiers from the response documents and retrieving respective new response documents for each new resource identifier from the OData service until no additional resource identifiers are extracted from the new response documents.

20 Claims, 4 Drawing Sheets

METHODS FOR TESTING ODATA SERVICES

TECHNICAL FIELD

This application relates to a computer implemented method, a computer system, and a computer readable medium for testing OData services.

BACKGROUND

Open Data Protocol (OData) is a hypertext transfer protocol (HTTP) based application protocol that supports the exchange of application data between a business logic server and an external user interface (UI) component such as an application on a mobile device. A client requests retrieving, creating or manipulating a resource on a server by a uniform resource identifier (URI). URIs identify resources. Data in requests and their responses are represented, e.g., by extensible markup language (XML) documents whose format is defined by the OData specification. OData documents contain URIs that are used to navigate to resources.

SUMMARY

The present disclosure describes computer implemented methods, computer systems, and computer readable mediums for testing an OData service. One method may include extracting resource identifiers from an initial service document, and for each of the resource identifiers, retrieving a respective response document from the OData service. The method may further include applying a test function to each of the resource identifiers and respective response documents and recording a result of the test function for each of the resource identifiers. The method may further include recursively extracting new resource identifiers from the response documents and retrieving respective new response documents for each new resource identifier from the OData service until no additional resource identifiers are extracted from the new response documents.

While generally described as computer implemented software embodied on non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

BRIEF DESCRIPTION OF THE DRAWINGS

Details of one or more implementations are set forth in the accompanying exemplary drawings and exemplary description below. Other features will be apparent from the description and drawings, and from the claims.

DETAILED DESCRIPTION

In the following, a detailed description of embodiments will be given with reference to the drawings. It should be understood that various modifications to the embodiments may be made. In particular, one or more elements of one or more embodiments may isolated from each other and may be combined and/or used in other embodiments to form new embodiments.

Figure 1:
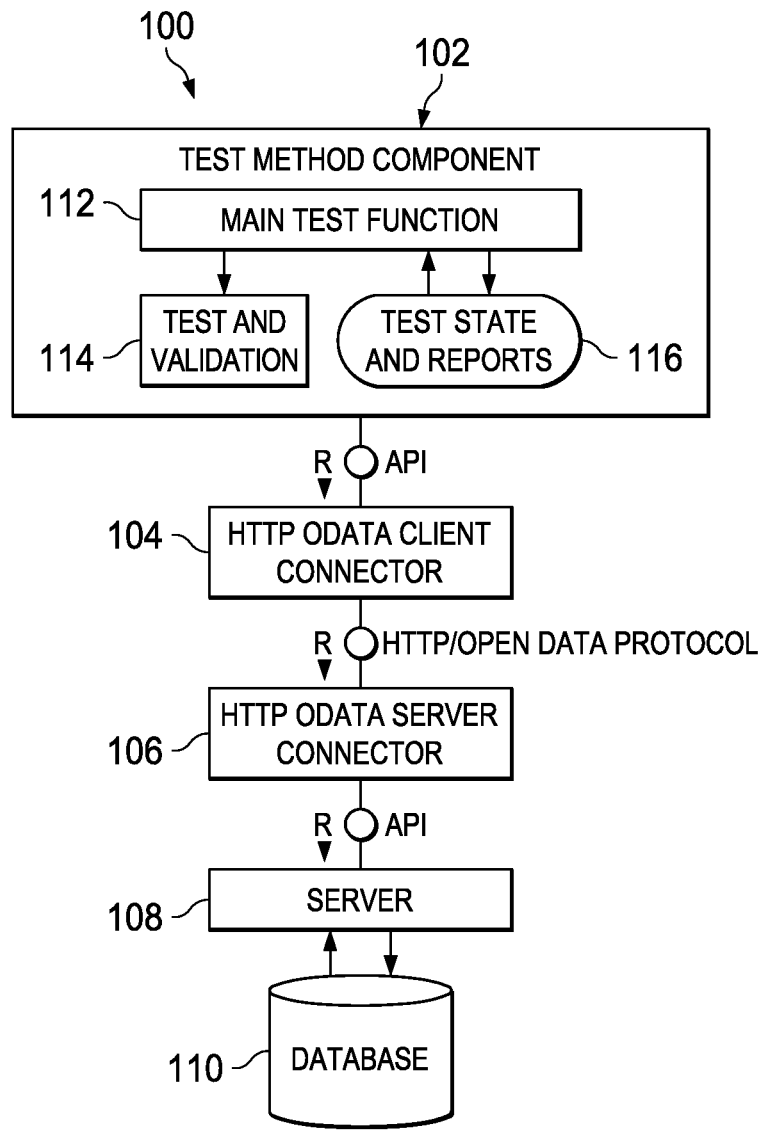
FIG. 1 is a block diagram of an example system 100 for testing and validating an OData service.

FIG. 1 is a block diagram of an example system 100 for testing and validating an OData service. The system includes a test method component 102, an HTTP OData Client Connector 104, an HTTP OData Server Connector 106, and a server 108. The server can be coupled to a database 110 or other data storage component. The server provides the OData service.

In general, the system uses the representational state transfer (REST) architecture. The REST architecture is a style of software architecture for distributed systems that includes clients and servers. The test method component, executing on a client device, sends a request to the HTTP OData Client Connector, which sends the request to the HTTP OData Server Connector, which then sends the request to the server. The request can specify a URI for a response document provided by the OData service.

The server accesses the database and provides a response. The application programming interface (API) between the test method component and the HTTP OData Client Connector belongs to the HTTP OData Client Connector, and the API between the HTTP OData Server Connector and the server belongs to the HTTP OData Server Connector.

The test method component includes a main test function module 112, a test and validation module 114, and storage for test state and reports 116. The test method component stores, in the storage, the current state of execution and a result of testing from the test and validation module. For example, the test method component can store a report including any URIs extracted from an OData Document and the result of retrieving a response document for those URIs and testing the URIs and responsive documents. The result can be an indication of success or failure.

In general, the test method component begins by receiving an initial service document from the OData service using the service root URI. The initial service document can include metadata for the OData service. The test method component extracts URIs from the initial service document. For example, the test method component can extract all the URIs, or a random sample of the URIs from the initial service document. The test method component then retrieves a response document from the OData service for each of the extracted URIs.

The test and validation module applies a test function to each of the URIs and the response documents and, for each tested URI, records the result of the test function in the storage. The test and validation functions express qualities related to the OData service definition. Successfully executing test and validation functions establishes that the service implementation fulfills the defined qualities. Examples of defined qualities include: an access to an URI does not break, an invalid URI returns a proper error message, an URI behaves consistently in relation to the metadata of the service. The test and validation module is general and extensible because, for any URI definition in a document, a corresponding test routine can be associated with the URI definition to test corresponding conditions for that URI.

The test method then continues recursively extracting new URIs from the response documents and retrieving new response documents until no additional URIs are extracted.

The test method can determine that no additional URIs are to be extracted for various reasons, for example, because a time limit has been reached, because there are no new URIs in the new response documents, or because a threshold number of URIs have been extracted.

The test and validation module applies a test function to each of the new URIs and new response documents and records, in the storage, the result of the test function. Because an OData service denotes a finite number of resources, the test method component is guaranteed to terminate.

In some implementations, the test method component guarantees that each URI of the OData service is requested at least once. For example, while recursively extracting new URIs, the system can extract all new URIs from new response documents, instead of sampling from the new response documents.

In some implementations, the test method component avoids requesting the same URI and HTTP operation more than once. For example, the system can maintain a list of tested URIs in the storage for test and state reports. The system can compare new URIs against the list of tested URIs and avoid retrieving new response documents for already tested URIs.

In some implementations, the test method component avoids testing the same document more than once. A document is identified by its ATOM:ID which is stored in the document. For example, the system can maintain a list of tested ATOM:IDs. The system can compare the ATOM:ID of a retrieved document against the list of URIs tested documents and avoid testing this document again. An ATOM:ID is an example of a URI. For example, the test method component can merge the list of tested URIs with the list of visited ATOM:IDs.

For documents that adhere to the Atom standard, the test method component can use the ATOM:ID element of the documents to maintain the list of tested URIs. The Atom standard refers to the Atom Syndication Format or the Atom Publishing Protocol or both, and it is an HTTP-based protocol for creating and updating documents. The ATOM:ID is an element that uniquely denotes the resource. The element name is "ID" and the qualifier "ATOM" refers to the proper schema, the Atom standard.

Example Test Functions

The following provides a description of some functionality of the main test function module using example pseudo code. The pseudo code abstracts from XML processing. A parser transforms an XML document (type ODATA_XML) into some object representation (type ODATA_DOC).

First, the following local variables are declared:

```
Declare uriSet of type SET of URI          // a set of URIs that are not yet visited
Declare visited of type SET of URI         // a set of URIs that has been already visited
and processed
Declare uri, origin of type URI            // the current OData URI
Create object connector of type CONNECTOR // a reference to the client connector
Declare response of type ODATA_XML
Declare obj, objMeta of type ODATA_DOC     // some document object tree type
Declare report as of type TABLE of (type URI, type http_operation, type http_code,
type STRING)
FUNCTION main( uri of type URI ) {
  1. set uri = service root URI            // input URI of some service to be tested
  2. response = connector.request(uri) // assign the retrieved service document
  3. IF (response represents error)
     3.1. report.add( uri, response.http_code, response.msg) // store the result
     3.2. STOP                             // terminate
  4. report.add( uri, response.http_code, "ok") // store the result
  5. obj = parse(response)
  6. IF (parsing failed )
     6.1. report.add(uri, response.http_code, "parser error")
     6.2. STOP
  7. response = connector.request( concatenate(uri, "$metadata" )) // request the
     metadata document
  8. objMeta = parse(response)
  9. report.add(objMeta).
  10. origin = uri.     // the uri of the current document is the origin of all URIs
     extracted from the document
  11. FOR EACH uri contained in obj: uriSet.add( origin, uri ).        // extract URIs of
     collections and actions
  12. WHILE (uriSet is non_empty) BEGIN
     12.1.     (origin, uri) = uriSet.pop       // removes some uri from the set
     12.2.     IF ( uri is in visited)
        12.2.1.     Continue at WHILE    // skip an uri processed already
     12.3.     visited.add (uri)
     12.4.     call retrieve( origin, uri )
     12.5.     if (call failed) continue at WHILE
     12.6.     call TestAndValidate(origin, uri, obj, objMeta)
  13. END_WHILE
  14. Clean the data base: clear uriSet, visited.
  15. STOP
}
```

The following abstraction requests a URI and processes the response:

```
FUNCTION retrieve (origin of type URI, uri of type URI) {
1.    response = connector.request(uri)
    1.1. IF (response represents error)
        1.2. report.add( uri, response.http_code, response.error_msg)
        1.3. RETURN FAILURE
2.    ELSE
3.    report.add( uri, response.http_code "ok" ) }
4.    obj = parse(response)
5.    IF (parsing failed ) {
        5.1. report.add(uri, response.http_code, "parser error")
        5.2. RETURN FAILURE }
6.    // here: request was successful and response parsed. Testing can start.
7.    IF ( obj.getAtomId( ) is in visited )
        7.1. RETURN FAILURE   // avoid testing the same document
                                twice
        7.2. ELSE visited.add( obj.getAtomId( ) )
8.    for each <link> element in obj {
        8.1. IF ((( rel==self) OR (link denotes a navigation property) OR
                (rel==edit) )
                AND (not href == uri )) {
        8.2. uriSet.add( href )
        8.3. FOR EACH { other uri contained in obj: uriSet.add( uri ). }
                // extract URIs of collections and actions
}
```

The following function abstraction logs the result of a request:

report.add(type URI, type http_code, type String)

The test method can, optionally, randomly select which subset of URIs of a collection document it adds to the uriSet. The randomization can happen in the following code line:

FOR EACH uri contained in obj: uriSet.add(uri).

The pair of origin and uri represents navigation paths and can be used in the testing function, e.g., the example TestAndValidate( ) function describe below.

Example Test and Validate Functions

The function abstraction TestAndValidate comprises all test and validation functions.

The function can be performed, for example, by the test and validation module.

```
Define TestAndValidate (origin of type URI, uri of type URI, obj,
objMeta of type ODATA_DOC) {
    IF (uri is in visited) RETURN;
    IF ( TestFunction_Self(origin, uri, obj Meta) fails ) RETURN;
    TestFunction_Queries(uri);
    TestFunction_Editable(origin, uri);
    TestFunction_ErrorMessages(uri);
    TestFunction_Conversions (uri, obj);
    TestFunction_ConsistencyWithMetaData (uri, objMeta);
}
```

The TestFunction_Self(origin, uri, objMeta) function tests that the request itself does not break. It can test the request, for example, using the self-reference contained in a <link> element where "<link>rel=self . . . ". Hence, for any single atom resource that can be accessed, e.g., via a filter or navigation property, the resource can also be accessed by the URI that is the unique representative of that resource. This test functionality can be covered by the function retrieve( ).

The TestFunction_Queries(uri) function tests via the QueryOption that filterable properties can be filtered. Filterable properties can be specified by the service metadata in object ojbMeta. The function also tests that nonfilterable properties can be filtered, which can produce an error. The function generates a set of meaningful QueryOptions for some subset of possible queries; tests the paging functionality using the query options $stop, $skip, and $inlinecount; and tests expand, with increasing depth of the navigation path, using the query option $EXPAND. For each depth of navigation path, the expand clauses are generated by transitive closure over the navigation properties as specified in the metadata. In general, a query is generated and appended to the URI, e.g., as illustrated in the following pseudo code:

```
FUNCTION TestFunction_Queries( uri of type URI) {
1.    FOR EACH test case: {
    1.1.    Declare q of type QueryOption
    1.2.    q = generateQuery( uri );
    1.3.    uri2 = uri append "?" append q:
    1.5.    call retrieve( origin, uri )
    1.6.    continue at FOR EACH // exec all test cases
2.    }
```

The TestFunction_Editable(uri) tests create, Modify, and Delete operations. The function depends on application knowledge specific to the OData service being tested.

The TestFunction_ErrorMessage(uri) function generates meaningful erroneous URIs and requests to test if the proper error code and message are returned. For example, the function can request a Read on a non-readable resource, request a Modify on a read-only resource, request a Create on a non-creatable resource, request a Delete on a non-deletable resource, and so on. The function can request GET_ENTITY on a 1 to many navigation, and the function can request GET_ENTITYSET on a 1 to 1 navigation. The function can test not providing mandatory fields in Create and Modify; test violations of scale and precision; and test on semantically wrong values, e.g., out of domain and invalid material number. The function can test requesting a resource for which the test users does not have permission to request.

The TestFunction_Conversions(uri) function tests various operations related to conversions. For example, the function request to modify/PUT a property that requires value conversions on the server, e.g., Date/Time. The function can request a subsequent Read/GET, and the function can then test on equality. Other examples include testing currency conversion with respect to corresponding meta data, testing unit of measurement conversions, testing null value conversion on non-domain values for null-able properties to confirm that the null rendered, and testing exit functions.

The TestFunction_MetaDataConsistency(uri, objMeta) function tests if properties defined in the MetaData are provisioned, e.g., contained in the response. The function can test referential constraints on associations, e.g., so that when a leading object is deleted its dependent objects are also deleted.

Figure 2:
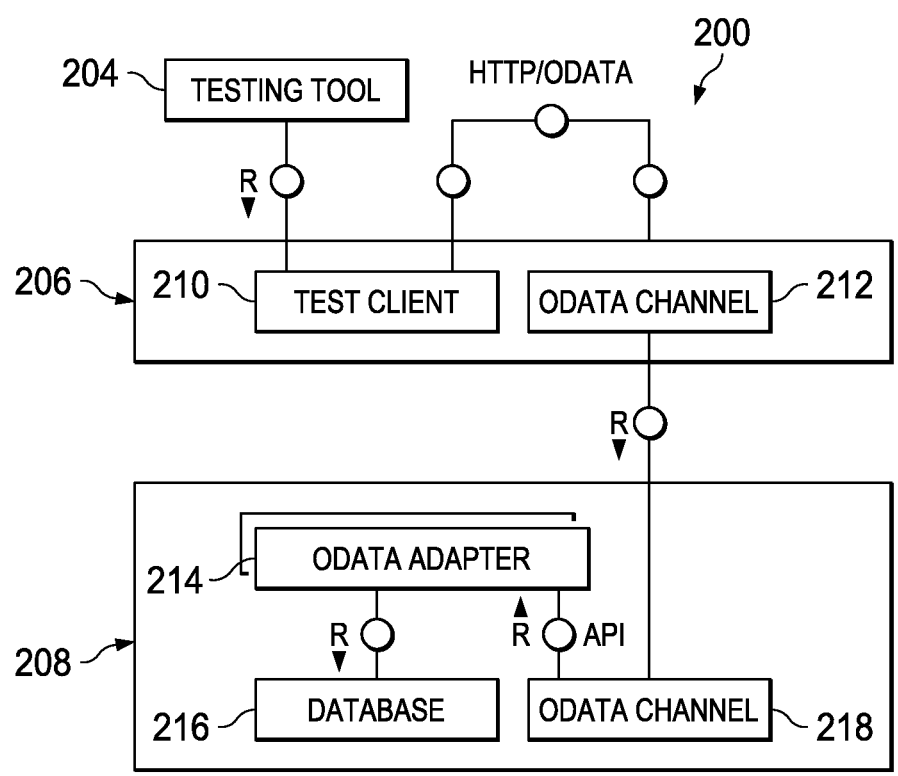
FIG. 2 is a block diagram of an example system 200 that implements the test method component of FIG. 1.

FIG. 2 is a block diagram of an example system 200 that implements the test method component of FIG. 1.

The system includes a testing tool 204, which can be, for example, an extended Computer Aided Test Tool (eCATT) client. The eCATT client is a tool for creating and executing functional tests for software.

The testing tool is coupled to a connector system 206 which is in turn coupled to a subject test system 208 that provides an OData Service. The connector system includes a test client 210, which can be controlled using the testing tool. The test client sends requests to an OData Channel 212 of the connector system, which then sends an OData request to the subject test system. For example, the testing tool can use a remote function call (RFC). The OData Channel 212 can also send the request using a generic RFC.

The subject test system includes a corresponding OData Channel 218, which processes the request and sends it to an OData Adapter 214. The OData Adapater sends the request to a database 216. The database can be accessed by a business logic module, or various other types of OData services.

Figure 3:
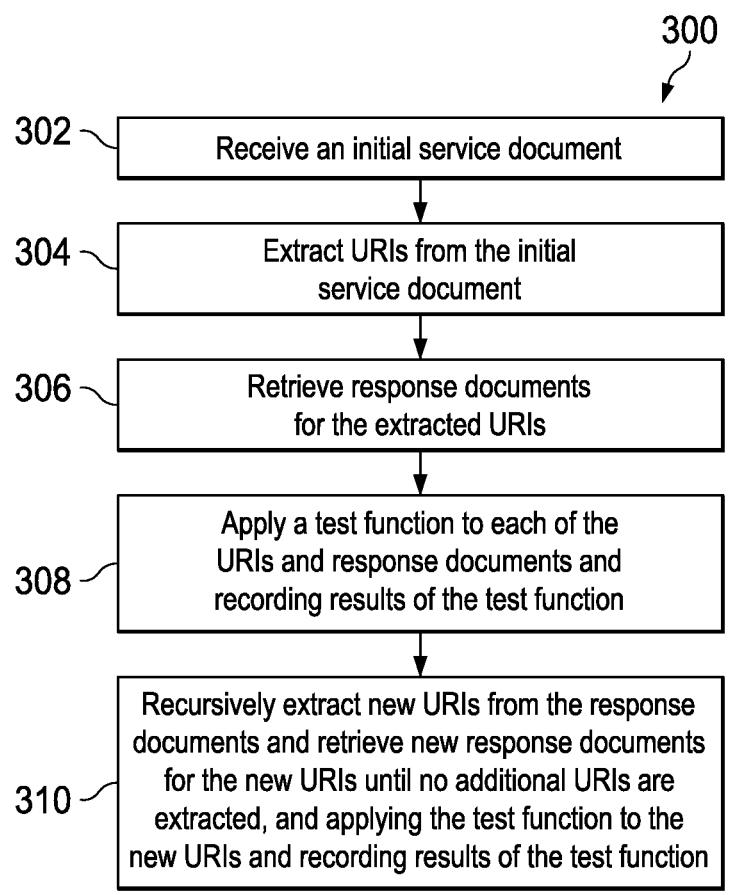
FIG. 3 is a flow diagram of an example method 300 for testing an OData service.

FIG. 3 is a flow diagram of an example method 300 for testing an OData service. The method can be performed by a system of one or more computers.

The system receives an initial service document (302). The system extracts URIs from the initial service document (304). For each of the URIs, the system retrieves a respective response document from the OData service (306). The system applies a test function to each of the URIs and response documents and records a result of the test function for each of the URIs (308).

Beginning with each of the response documents, the system recursively extracts new URIs from the response documents and retrieves respective new response documents for each new URI from the OData service until no new URIs are extracted from new response documents (310). The system applies the test function to each of the new URIs and respective new response documents and records a result of the test function for each of the URIs.

Figure 4:
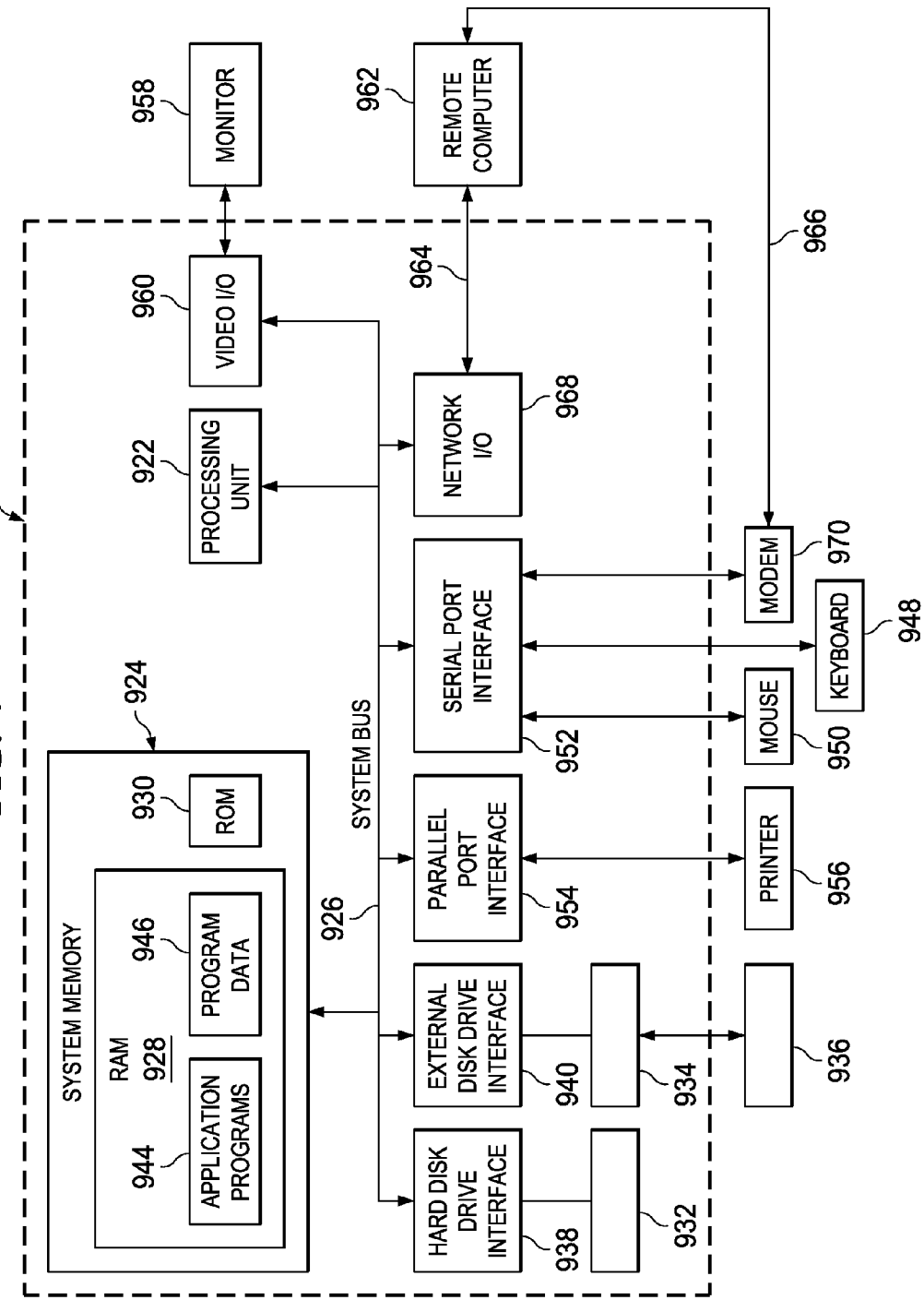
FIG. 4 shows an example system for implementing the method including a general purpose computing device in the form of a conventional computing environment.

FIG. 4 shows an example system for implementing the method including a general purpose computing device in the form of a conventional computing environment 920 (e.g. a server). The conventional computing environment includes a processing unit 922, a system memory 924, and a system bus 926. The system bus couples various system components including the system memory 924 to the processing unit 922. The processing unit 922 may perform arithmetic, logic and/or control operations by accessing the system memory 924. The system memory 924 may store information and/or instructions for use in combination with the processing unit 922. The system memory 924 may include volatile and non-volatile memory, such as a random access memory (RAM) 928 and a read only memory (ROM) 930. A basic input/output system (BIOS) containing the basic routines that helps to transfer information between elements within the server 920, such as during start-up, may be stored in the ROM 930. The system bus 926 may be any of several types of bus structures including a memory bus or memory controller, a peripheral bus, and a local bus using any of a variety of bus architectures.

The server 920 may further include a hard disk drive 932 for reading from and writing to a hard disk (not shown), and an external disk drive 934 for reading from or writing to a removable disk 936. The removable disk may be a magnetic disk for a magnetic disk driver or an optical disk such as a CD ROM for an optical disk drive. The hard disk drive 932 and the external disk drive 934 are connected to the system bus 926 by a hard disk drive interface 938 and an external disk drive interface 940, respectively. The drives and their associated computer-readable media provide nonvolatile storage of computer readable instructions, data structures, program modules and other data for the server 920. The data structures may include relevant data for the implementation of the method, as described above. The relevant data may be organized in a database, for example a relational database management system or an object-oriented database management system.

Although the exemplary environment described herein employs a hard disk (not shown) and an external disk 936, other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 936, ROM 930 or RAM 928, including an operating system (not shown), one or more application programs 944, other program modules (not shown), and program data 946. The application programs may include at least a part of the functionality as depicted in FIGS. 1 to 3.

A user may enter commands and information, as discussed below, into the server 920 through input devices such as keyboard 948 and mouse 950. Other input devices (not shown) may include a microphone (or other sensors), joystick, game pad, scanner, or the like. These and other input devices may be connected to the processing unit 922 through a serial port interface 952 that is coupled to the system bus 926, or may be collected by other interfaces, such as a parallel port interface 954, game port or a universal serial bus (USB). Further, information may be printed using printer 956. The printer 956 and other parallel input/output devices may be connected to the processing unit 922 through parallel port interface 954. A monitor 958 or other type of display device is also connected to the system bus 926 via an interface, such as a video input/output 960. In addition to the monitor, computing environment 920 may include other peripheral output devices (not shown), such as speakers or other audible output.

The computing environment 920 may communicate with other electronic devices such as a computer, telephone (wired or wireless), personal digital assistant, television, or the like. To communicate, the computer environment 920 may operate in a networked environment using connections to one or more electronic devices. FIG. 2 depicts the computer environment networked with remote computer 962, i.e. mobile device 102. The remote computer 962 may be another computing environment such as a mobile device such as a smart phone or tablet, and may include many of the elements described above relative to the computing environment 920. The logical connections depicted in FIG. 8 include a local area network (LAN) 964 and a wide area network (WAN) 966. Such networking environments are commonplace in offices, enterprise-wide computer networks, intranets and the Internet and may particularly be encrypted.

When used in a LAN networking environment, the computing environment 920 may be connected to the LAN 964 through a network I/O 968. When used in a WAN networking environment, the computing environment 920 may include a modem 970 or other means for establishing communications over the WAN 966. The modem 970, which may be internal or external to computing environment 920, is connected to the system bus 926 via the serial port interface 952. In a networked environment, program modules depicted relative to the computing environment 920, or portions thereof, may be stored in a remote memory storage device resident on or accessible to remote computer 962. Furthermore other data relevant to the method may be resident on or accessible via the remote computer 962. It will be appreciated that the network connections shown are exemplary and other means of establishing a communications link between the electronic devices may be used.

The above-described computing system is only one example of the type of computing system that may be used to in the method described above.

What is claimed is:

1. A method performed by one or more computers for testing an OData service, the method comprising:
    receiving an initial service document from the OData service;

extracting a plurality of resource identifiers from the initial service document;
for each of the resource identifiers, retrieving a respective response document from the OData service;
applying a test function to each of the resource identifiers and respective response documents and recording a result of the test function for each of the resource identifiers;
beginning with each of the response documents, recursively extracting new resource identifiers from the response documents and retrieving respective new response documents for each new resource identifier from the OData service until no additional resource identifiers are extracted from the new response documents, and applying the test function to each of the new resource identifiers and respective new response documents and recording a result of the test function for each of the new resource identifiers.

2. The method of claim 1, wherein recursively extracting new resource identifiers comprises maintaining a list of tested resource identifiers, comparing new resource identifiers against the list of tested resource identifiers, and avoiding retrieving a respective new response document for any new resource identifiers on the list of tested resource identifiers, thereby avoiding applying the test function to the same resource identifier more than once.

3. The method of claim 1, wherein each resource identifier comprises an ATOM:ID.

4. The method of claim 1, wherein recursively extracting new resource identifiers comprises extracting all new resource identifiers, thereby guaranteeing that each resource identifier of the OData service is tested at least once.

5. The method of claim 1, wherein recursively extracting new resource identifiers comprises extracting a random number of resource identifiers.

6. The method of claim 1, wherein applying the test function to each of the resource identifiers and respective response documents comprises determining that an access to a first resource identifier does not break.

7. The method of claim 1, wherein applying the test function to each of the resource identifiers and respective response documents comprises determining that an access to a first invalid resource identifier returns a proper error message.

8. The method of claim 1, wherein the initial service document is an extensible markup language (XML) representation of an OData service definition for the OData service.

9. The method of claim 1, wherein retrieving a response document from the OData service comprises sending a hypertext transfer protocol (HTTP) request to the OData service.

10. The method of claim 9, wherein recording a result of the test function comprises recording an HTTP operation used to retrieve a response document and either a success or a failure of the HTTP operation.

11. A system of one or more computers configured to perform operations for testing an OData service, the operations comprising:
receiving an initial service document from the OData service;
extracting a plurality of resource identifiers from the initial service document;
for each of the resource identifiers, retrieving a respective response document from the OData service;
applying a test function to each of the resource identifiers and respective response documents and recording a result of the test function for each of the resource identifiers;
beginning with each of the response documents, recursively extracting new resource identifiers from the response documents and retrieving respective new response documents for each new resource identifier from the OData service until no additional resource identifiers are extracted from the new response documents, and applying the test function to each of the new resource identifiers and respective new response documents and recording a result of the test function for each of the new resource identifiers.

12. The system of claim 11, wherein recursively extracting new resource identifiers comprises maintaining a list of tested resource identifiers, comparing new resource identifiers against the list of tested resource identifiers, and avoiding retrieving a respective new response document for any new resource identifiers on the list of tested resource identifiers, thereby avoiding applying the test function to the same resource identifier more than once.

13. The system of claim 11, wherein each resource identifier comprises an ATOM:ID.

14. The system of claim 11, wherein recursively extracting new resource identifiers comprises extracting all new resource identifiers, thereby guaranteeing that each resource identifier of the OData service is tested at least once.

15. The system of claim 11, wherein recursively extracting new resource identifiers comprises extracting a random number of resource identifiers.

16. The system of claim 11, wherein applying the test function to each of the resource identifiers and respective response documents comprises determining that an access to a first resource identifier does not break.

17. The system of claim 11, wherein applying the test function to each of the resource identifiers and respective response documents comprises determining that an access to a first invalid resource identifier returns a proper error message.

18. The system of claim 11, wherein retrieving a response document from the OData service comprises sending a hypertext transfer protocol (HTTP) request to the OData service.

19. The system of claim 18, wherein recording a result of the test function comprises recording an HTTP operation used to retrieve a response document and either a success or a failure of the HTTP operation.

20. A computer storage medium encoded with a computer program, the program comprising instructions that when executed by one or more computers cause the one or more computers to perform operations comprising:
receiving an initial service document from an OData service;
extracting a plurality of resource identifiers from the initial service document;
for each of the resource identifiers, retrieving a respective response document from the OData service;
applying a test function to each of the resource identifiers and respective response documents and recording a result of the test function for each of the resource identifiers;
beginning with each of the response documents, recursively extracting new resource identifiers from the response documents and retrieving respective new response documents for each new resource identifier from the OData service until no additional resource identifiers are extracted from the new response documents, and applying the test function to each of the new resource identifiers and respective new response documents and recording a result of the test function for each of the new resource identifiers.

* * * * *